Patented Dec. 6, 1927.

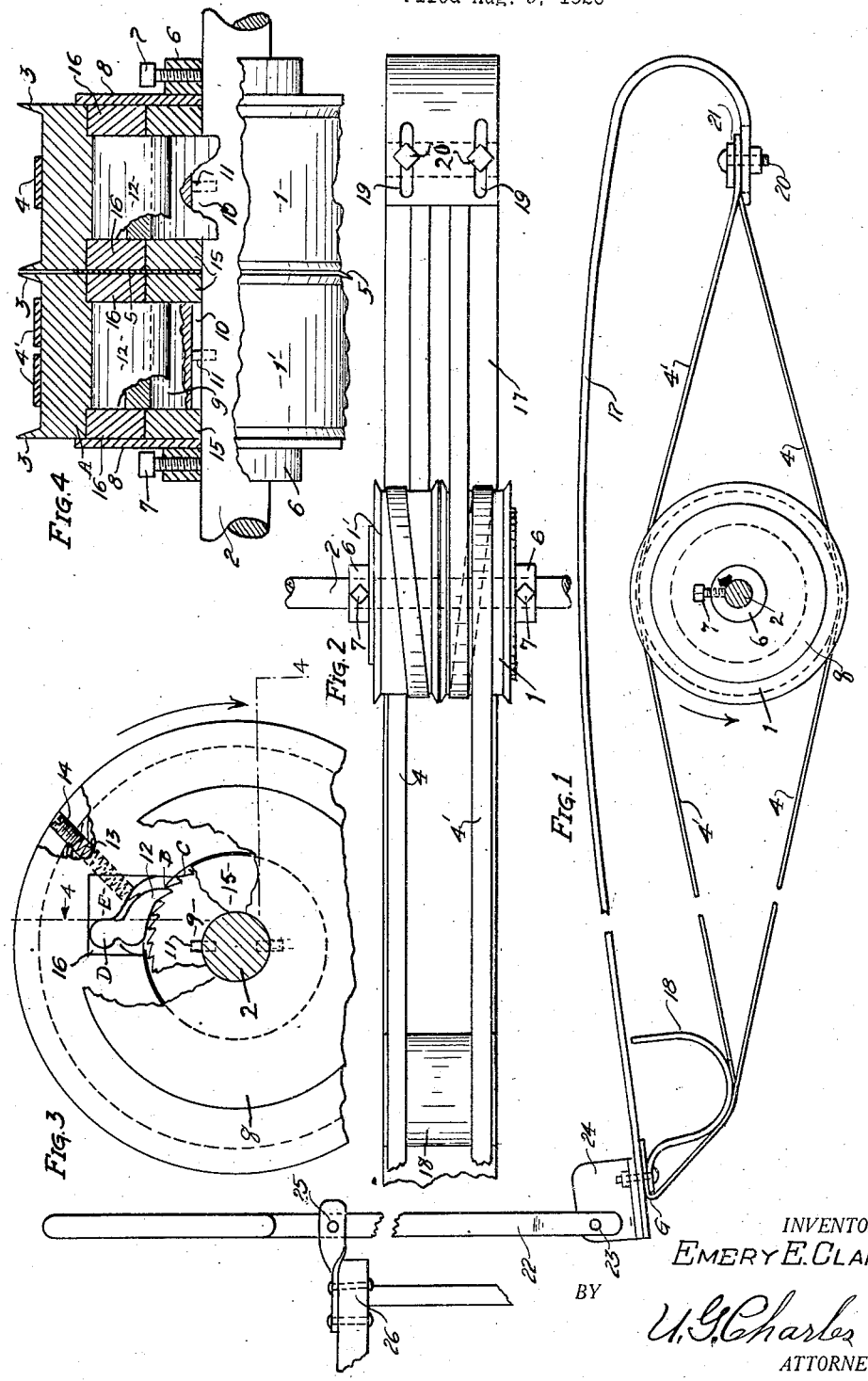

1,651,997

UNITED STATES PATENT OFFICE.

EMERY E. CLARK, OF TOPEKA, KANSAS.

POWER-TRANSMITTING MEANS.

Application filed August 3, 1926. Serial No. 126,816.

My invention relates to a power transmitting means.

The object of my invention is to provide a reciprocating means continuously driving the shaft in one direction.

A further object of my invention is to exercise a long or short stroke which is optional with the operator.

A still further object of my invention is to provide a pawl having its pivotal bearing in a socket.

A still further object of my invention is to house the ratchet and pawl in a silencing means.

A still further object of my invention is to provide adjustable tensioning means for the belts.

These and other objects will be hereinafter more fully explained.

Referring to the drawings:

Fig. 1 is an elevation of the device.

Fig. 2 is an inverted plan view of Fig. 1.

Fig. 3 is an enlarged side view of the pulleys, parts removed for convenience of illustration.

Fig. 4 is a transverse view of Fig. 3 taken along line 4—4, looking in the direction of the arrow.

The mechanism herein disclosed consists of a pair of pulleys 1 and 1'; the said pulleys being mounted on a shaft 2 as a power transmitting means for vehicles, line shafts or the like.

The said pulleys are provided with flanges 3 as means to prevent the belts 4 and 4' from running off while in action.

As a convenient position to rotate the pulleys I have placed them snugly together engaging on a separator 5 and preferably made of brass to prevent unusual wear of the sides of the pulleys during their rotations which are in opposite directions. Each of the said pulleys is attached in position on the shaft by means of a collar 6 having a set-screw 7 threadedly engaging through the collar to contact firmly with the shaft, one collar being on each side of the pulleys as shown in Fig. 4.

Between the collars and sides of the pulleys I have placed washers 8 for the purpose hereinafter described. It will be understood that the two pulleys are made alike, the reference characters however will be applied to both.

Concentrically positioned within the pulley is a ratchet member 9, the said member having a key-way 10 diametrically positioned in both sides thereof and adapted to engage with pins 11 which are rigidly attached to the shaft as means for rotating the shaft as the pulley revolves in the direction of the arrow as shown in Fig. 3.

Housed within the shell A of the pulley is a pawl 12 having an edge B adapted to engage with teeth C of the ratchet. The said pawl being in length equal to the thickness of the ratchet member, the opposite side of the pawl from the tooth being round as at D has its bearing in an aperture which is bored transversely to the shell of the pulley. The shell is also cut away sufficient for the reciprocations of the pawl to rock while passing over the teeth of the ratchet. The said pawl is tensioned by a spring 13 which engages in an aperture through the shell and compressed by a set screw 14 threadedly engaging in the aperture by which means the tension of the spring may be varied. The said screw is shown protruding, but will be driven flush with the face of the pulley for correct engagement.

The diameter of the ratchet over the teeth is slightly smaller than the diameter of the bore through the pulley to avoid friction between the teeth and the shell. As a means to support the pulleys in working relation to the ratchets I have provided annular members 15, one being on each side of the pulleys and flush therewith fitting snugly peripherally in the bores thereof. The said members function as bearings for rotatable engagement of the pulleys on the shaft. As a means for aligned registry of the side of the pulley and the annular member I have provided a washer 8 of sufficient diameter to lap well on to the side of the pulley over the joint. The said washer also functions as supporting means for a square like member 16 adapted to close the opening in which the pawl functions preventing said pawl from lateral movement, but providing sufficient play for free movement to engage with the teeth of the ratchet which is accomplished by said member seating in the pulley as at E.

It will be understood that the members 15 and 16 are supported in position by the close engagement of the pulleys as shown in Fig. 4.

As a means for tensioning and manipulating the belts 4 and 4' I have provided a tensioning member 17, the rear end being returned by a curve and the front end having a curved member 18, both of said members functioning as spacing means for clearance of the spring above the pulleys; the rear end being provided with elongated slots 19 having bolts 20 engaging therethrough to vary the tension of the belts. The said bolts simultaneously engage through said slots and through apertures in a bar 21 as clamping means for the ends of the belts. The opposite or front end of the belts are clamped between the curved end of member 18 and the spring member as at G.

It is now readily seen how the belts are tensioned tightly on the pulleys to prevent slipping as the spring member reciprocates longitudinally by rocking a lever 22 the end of which is bifurcated and pivotally connected as at 23 to an outwardly extending web 24 which is firmly attached to a spring member. The said lever is pivotally attached as at 25 to a support 26, the said support being positioned in accordance with the mechanism on which the device functions. The opposite or rear end of the tensioning member is fastened to the belts.

To operate my power transmitting means rotating the shaft 2 in one continuous direction while the spring member reciprocates longitudinally I wind the belts once around their respective pulleys in opposite directions so that when the spring member is driven forward the belt 4' will rotate the shaft in the direction indicated by the arrow in Fig. 1. When driven rearward the belt 4 will rotate pulley 1' in the same direction continuously rotating the shaft. The length of the strokes may be varied without interlapping the ratchets of the pulleys. The spring belt tensioning member is shown as being made of a single piece of metal having attaching means thereon. I do not confine this to be made as illustrated as other materials may be used providing a spring, tensioning the belts in other ways.

Such other modifications may be employed as lie within the scope of the appended claim.

Having thus described my invention, what I claim as new and desire to secure by Letters Patent is:—

In a power transmitting means, a pair of ratchets rigidly connected to a shaft, annular members abutting the ends of the ratchet members, a pair of pulleys trunnioned on the annular members, means for aligning the pulleys and the annular members, pawls rockably mounted in the pulleys to engage with the ratchets, springs tensioning the pawls, belts wound on the pulleys so that the extended ends of the belts will be from opposite sides of the pulleys, a tensioning member adapted to receive the ends of the belts converging to the connection with their tensioning member so that by longitudinal reciprocations of said member the belts will rotate the pulleys in opposite directions for continuous rotation of the shaft in one direction, a lever connected to one end of the tensioning member as reciprocating means therefor the opposite end of said tensioning means being carried by one of the belts.

EMERY E. CLARK.